(12) United States Patent
Gong (10) Patent No.: US 10,177,622 B2
(45) Date of Patent: Jan. 8, 2019

(54) STEERING MOTOR

(71) Applicant: SHENZHEN ZHIXING SINGLE-AXLE TWO-WHEELED DRIVING TECHNOLOGY CO., LTD., Shenzhen, Guangdong (CN)

(72) Inventor: Shugang Gong, Shenzhen (CN)

(73) Assignee: SHENZHEN ZHIXING SINGLE-AXLE TWO-WHEELED DRIVING TECHNOLOGY CO., LTD., Shenzhen, Guangdong (CN)

( * ) Notice: Subject to any disclaimer, the term of this patent is extended or adjusted under 35 U.S.C. 154(b) by 306 days.

(21) Appl. No.: 15/300,590

(22) PCT Filed: Mar. 31, 2014

(86) PCT No.: PCT/CN2014/074347
§ 371 (c)(1),
(2) Date: Sep. 29, 2016

(87) PCT Pub. No.: WO2015/149208
PCT Pub. Date: Oct. 8, 2015

(65) Prior Publication Data
US 2017/0110926 A1   Apr. 20, 2017

(51) Int. Cl.
*H02K 5/24* (2006.01)
*B62D 5/04* (2006.01)
(Continued)

(52) U.S. Cl.
CPC ............... *H02K 5/04* (2013.01); *B62D 5/04* (2013.01); *B62D 5/0418* (2013.01); *B62D 7/02* (2013.01);
(Continued)

(58) Field of Classification Search
CPC .. H02K 5/24; H02K 5/04; H02K 5/10; H02K 5/15; H02K 23/04; H02K 19/02;
(Continued)

(56) References Cited

U.S. PATENT DOCUMENTS 2,589,341 A * 3/1952 Chisholm, Jr. ........ B64C 25/505
180/429
3,657,967 A * 4/1972 Suzuki .................... B62D 5/08
91/372
(Continued)

FOREIGN PATENT DOCUMENTS

CN   101635484   1/2010
CN   102052324   5/2011
(Continued)

OTHER PUBLICATIONS

International Search Report for PCT/CN2014/074347, dated Jan. 6, 2015, 4 pages including English translation.

*Primary Examiner* — Edgardo San Martin
(74) *Attorney, Agent, or Firm* — Hamre, Schumann, Mueller & Larson, P.C.

(57) ABSTRACT

Disclosed is a steering motor, comprising a casing (10) and a stator (15), an outer wall of the stator (15) and an inner wall of the casing (10) forming a chamber (16). The steering motor further comprises an upper cover buffering assembly (1) and an oil distributor (2), which are fitted with each other to form an axial cavity (4). A cylinder assembly (5) is provided below the oil distributor (2), and comprises a cylinder (51) and an elastic oil bag (52). Furthermore, the cylinder (51) is provided internally with a piston (53) which is connected to a lower end of the elastic oil bag (52) and slides axially along the cylinder. An oil flow passage (23), an oil inlet (22) and a hollow column (21) are provided in the oil distributor (2), the oil flow passage (23) being in communication with the axial cavity (4), and an inner wall of the
(Continued)

hollow column (21) being provided with an oil flow port in communication with the oil flow passage (23). A directional control valve (3) having a valve core is provided in the hollow column (21), and a radial cavity is formed by the inner wall of the hollow column (21) and an outer wall of the directional control valve (3) and is partitioned into two independent radial cavities by inserting a pin (7). In the steering motor, by means of fitting the valve core with a valve cavity of the directional control valve, the oil passage is divided into two independent branch oil passages so as to simplify the structure; and the elastic oil bag is used to reduce frictional wear so as to prolong the service life of motor and reduce the costs.

10 Claims, 6 Drawing Sheets

(51) Int. Cl.
  *B62D 7/22* (2006.01)
  *H02K 5/04* (2006.01)
  *H02K 7/14* (2006.01)
  *H02K 7/08* (2006.01)
  *B62D 7/02* (2006.01)
  *H02K 5/00* (2006.01)
  *B62D 5/00* (2006.01)
  *B62D 7/00* (2006.01)

(52) U.S. Cl.
  CPC ............... *B62D 7/22* (2013.01); *H02K 7/08* (2013.01); *H02K 7/14* (2013.01)

(58) Field of Classification Search
  CPC .......... H02K 9/22; B62D 5/04; B62D 5/0418; B62D 5/0403; B62D 5/0409; B62D 5/0421; B62D 7/22; F16C 33/78; F16C 33/7816; F16C 33/782
  See application file for complete search history.

(56) References Cited

U.S. PATENT DOCUMENTS

| | | | | |
|---|---|---|---|---|
| 4,632,641 | A * | 12/1986 | Liska | B62D 6/00 |
| | | | | 417/273 |
| 4,699,231 | A * | 10/1987 | Lang | B62D 5/22 |
| | | | | 180/428 |
| 5,961,309 | A * | 10/1999 | Harpole | F04C 15/0049 |
| | | | | 417/540 |
| 7,061,147 | B2 * | 6/2006 | Ries | B63H 5/125 |
| | | | | 310/51 |
| 2013/0249356 | A1 * | 9/2013 | Nakano | H02K 5/24 |
| | | | | 310/68 D |
| 2015/0357878 | A1 * | 12/2015 | Fukunaga | H02K 3/50 |
| | | | | 310/71 |
| 2017/0106901 | A1 * | 4/2017 | Gong | B62D 5/062 |
| 2017/0110926 | A1 * | 4/2017 | Gong | H02K 7/14 |
| 2017/0110927 | A1 * | 4/2017 | Gong | H02K 5/24 |
| 2017/0110931 | A1 * | 4/2017 | Gong | H02K 5/24 |
| 2018/0111643 | A1 * | 4/2018 | Kim | B62D 5/0409 |
| 2018/0148091 | A1 * | 5/2018 | Krieger | F16F 15/04 |

FOREIGN PATENT DOCUMENTS

| | | |
|---|---|---|
| CN | 102104297 | 6/2011 |
| CN | 103527438 | 1/2014 |
| JP | 2008079470 | 4/2008 |

\* cited by examiner

STEERING MOTOR

FIELD OF THE INVENTION

The present application relates to the technical field of motor structures, especially to a steering motor.

BACKGROUND OF THE INVENTION

With continuous development of automobile industry, steering systems of automobiles have obtained rapid progresses, and an electric power steering system is the development direction of automobile steering systems. The steering power of the system is directly provided by a steering motor some components required by traditional hydraulic power steering systems are then omitted, and hence not only is energy saved but also the environment is protected. Furthermore, the system further has features that it is easy to be adjusted and flexible to be assembled and the steering power can be provided under various circumstances.

When a driver operates a steering wheel to veer, a torque sensor detects the veer of the steering wheel and the extent of the torque, and transmits a voltage signal to an electronic control unit. The electronic control unit sends an instruction to a steering motor controller according to the torque voltage signal, the steering direction, and the automobile speed signal detected by the torque sensor, and makes the steering motor output a steering power torque with corresponding magnitude and direction, thereby producing auxiliary power. When the automobile does not veer, the electronic control unit will not send any instruction to the motor controller, and the motor does not work.

When a vehicle runs on a road with bad road conditions, the whole vehicle shakes with the steering motor continuously. In order to overcome the bad influence that the bad road conditions cause shocks of the steering motor, a damping system is arranged inside the steering motor. A traditional damping system generally utilizes a carbon brush and a collector ring; when the steering motor suffers shocks, the damping system begins to work and constantly buffers the shocks, which makes the carbon brush and the collector ring be rubbed continuously, hence the carbon brush and the collector ring may be worn and damaged due to friction. Furthermore, the carbon brush and the collector ring are sensitive to temperature, and are prone to damage because of temperature changes, such that the stability and service life of the steering motor are seriously affected.

Existing steering motors are generally provided with a variety of oil passages, such as oil passages for shock absorption oil supply, oil passages for braking oil supply, oil passages for hoist oil supply, etc; however, these oil passages are all designed independently and assembled separately, such that each of the oil passages are isolated from each other. Thus, the oil passages occupy too much space in the steering motor, such that the structure of the steering motor is complex, which not only wastes resources but also increases manufacturing cost.

SUMMARY OF THE INVENTION

Technical Problems

A purpose of the present application is to provide a steering motor, and aims to overcome the following defects existing in the steering motor in the prior art:

1) Each of the oil passages inside the steering motor is designed independently, which occupies a relatively large inner space in the steering motor, makes the structure of the steering motor be complicated, and increases the volume thereof, thereby wasting resources and increasing manufacturing cost.

2) In a cylinder assembly inside the steering motor, constant friction during the damping process makes the structure be worn and damaged, and the temperature changes make the structure be damaged, thereby affecting the stability and service life of the steering motor.

Technical Solutions

A technical solution provided by the present application is that: a steering motor includes a casing with a cavity and a stator arranged in the cavity of the casing; wherein an outer wall of the stator and an inner wall of the casing form a chamber;

the steering motor further includes an upper cover buffering assembly and an oil distributor; the oil distributor is arranged under the upper cover buffering assembly, and fitted with the upper cover buffering assembly to form an axial cavity;

a cylinder assembly is fixedly arranged under the oil distributor; the cylinder assembly includes a cylinder with openings defined at two ends thereof, and an elastic oil bag arranged in the cylinder and defining an opening at an upper end thereof; the upper end of the elastic oil bag is fixedly connected to an inner wall of the cylinder and communicated with the axial cavity; the cylinder is further provided therein with a piston that is capable of sliding axially along the cylinder; the piston is connected to a lower end of the elastic oil bag;

the oil distributor is provided with an oil flow passage arranged radially and in communication with the axial cavity; the oil distributor is provided with an oil inlet; a hollow column that is arranged axially and has an inner cavity extends upwards and downwards respectively inside the oil distributor; an inner wall of the hollow column is provided with an oil flow opening in communication the oil flow passage;

an inner side of the hollow column is provided with a reversing valve which has a valve core; an inner sidewall of the hollow column and an outer wall of the reversing cavity form a first radial cavity; the first radial cavity is embedded with a pin; the first radial cavity is separated by the pin to form an oil-distributor oil-inlet cavity and an oil-distributor oil-outlet cavity which are independent of each other; the oil-distributor oil-inlet cavity is in communication with the oil inlet, and the oil-distributor oil-outlet cavity is in communication with the axial cavity;

a center of the valve core is provided with a circular through-hole; a plurality of open ring slots are arranged around an outer wall of the valve core; each of the open ring slots is embedded internally with an O-shaped seal ring;

an upper portion of a sidewall of the valve cavity is provided with a reversing-valve oil-flow passage arranged to penetrate radially, and an axial lower portion of the reversing-valve oil-flow passage is provided with an oil flow hole arranged radially;

an oil-flow ring slot with a semicircle shaped section is arranged around an outer wall of an upper end of the valve core, and the oil-flow ring slot is in communication with the oil-distributor oil-inlet cavity and the oil-distributor oil-outlet cavity;

an outer wall of a lower end of the valve core and a sidewall of a lower portion of the valve cavity form a second radial cavity; a lower portion of the valve cavity is provided with an oil outlet; the oil outlet is in communication with the second radial cavity.

Furthermore, the reversing valve further includes a winding coil positioned under the oil distributor and sheathed around a periphery of the valve cavity.

Preferably, the upper cover buffering assembly includes an upper cover and a buffering assembly; the buffering assembly includes an elastomer, an elastic spacer and an elastic diaphragm which are laminated inside the axial cavity in sequence; an edge of the elastic diaphragm is embedded into a lower margin of the inner side of the upper cover and fixedly connected with an inner wall of the axial cavity and forms a seal.

Furthermore, a bottom end of the oil distributor is provided with a damping hole, wherein the damping hole is arranged to be aligned with the top end of the elastic oil bag, and is in communication with the axial cavity and the elastic oil bag respectively.

Furthermore, an aperture of the damping hole is smaller than a caliber of the opening of the upper end of the elastic oil bag.

Furthermore, the elastic diaphragm is butterfly-shaped; the oil distributor and the upper cover buffering assembly are fitted with each other to form a seal through a fastener.

Preferably, the steering motor includes a plurality of the cylinder assemblies; each of the cylinder assemblies is positioned under the oil distributor, and is arranged in circular inside the steering motor.

Preferably, a bottom end of the valve core is provided with a valve tail, the valve tail extends downwards to the bottom end of the valve cavity; both an inner wall and an outer wall of the valve tail are provided with open slots; a hollow bellows is embedded inside the open slots; the hollow bellows extends downwards beyond the bottom end of the valve core.

Furthermore, an inner wall of a top end of the hollow column is sheathed with a deep groove ball bearing; a hollow sleeve is sheathed in an inner ring of the deep groove ball bearing; an inner diameter of the hollow sleeve is smaller than an inner diameter of the circular through-hole defined in the valve core.

Furthermore, a pipeline sheath is arranged inside the hollow sleeve; the pipeline sheath extends downwards along the inner wall of the hollow sleeve and beyond the hollow bellows.

Beneficial Effect

Compared with the prior art, the steering motor provided by the present application utilizes a combined design of oil passages therein, and simplifies the whole structure of the steering motor by simplifying oil passage structure; furthermore, the steering motor is further provided therein with a cylinder assembly, the cylinder assembly utilizes an elastic oil bag, which reduces structural wear and damage caused by friction during a damping process, thereby prolonging the service life of the steering motor and saving cost.

DETAILED DESCRIPTION OF THE PREFERRED EMBODIMENT

In order to make the purposes, technical solutions, and advantages of the present application more clear, the present application will be further described in detail hereinafter with reference to accompanying drawings and embodiments. It should be understood that the specific embodiments described herein are merely intended to explain but not to limit the present application.

The implementation of the present application will be described in detail hereinafter with reference to the following specific embodiments.

As shown in FIGS. 1-6, the present application provides a preferred embodiment.

Figure 1:
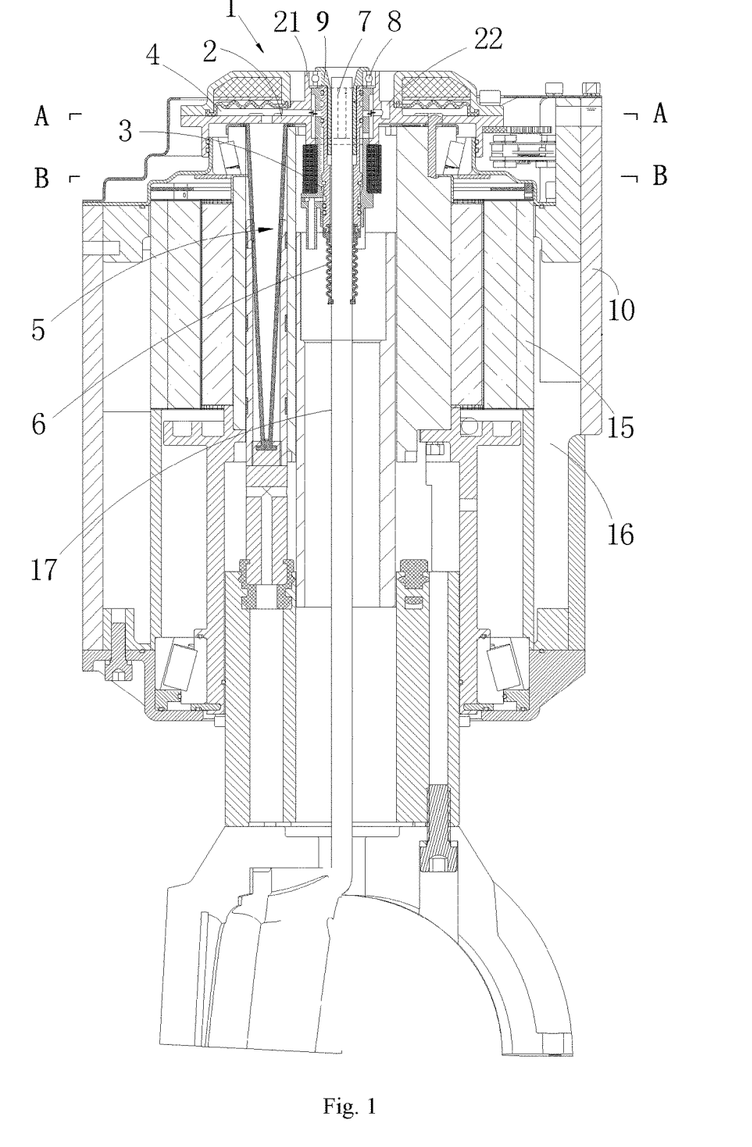
FIG. 1 is a sectional schematic view of a steering motor provided by an embodiment of the present application.

The embodiment provides a steering motor, which includes a casing 10 with a cavity; a stator 15 is arranged in the cavity of the casing 10, and a chamber 16 is formed between an outer wall of the stator 15 and an inner wall of the casing 10.

The steering motor further includes an upper cover buffering assembly 1 and an oil distributor 2; wherein the oil distributor 2 is arranged under the upper cover buffering assembly 1, and the upper cover buffering assembly 1 and the oil distributor 2 are fitted with each other to form a sealed axial cavity 4; the axial cavity 4 is provide therein with a buffering assembly 11 configured to cooperate with oil fluid to buffer shocks.

A cylinder assembly 5 is fixedly arranged under the oil distributor 2; the cylinder assembly 5 includes a cylinder 51, an elastic oil bag 52 and a piston 53. Two ends of the cylinder 51 are provided with openings; both the elastic oil bag 52 and the piston 53 are arranged in the cylinder 51; the elastic oil bag 52 is a saccular elastic diaphragm with an opening defined at an upper end thereof, and an edge of the opening at the upper end of the elastic oil bag 52 are fixedly connected with an inner wall of an upper opening of the cylinder 51, thereby forming a seal for the upper opening of the cylinder 51. Furthermore, the opening at the upper end of the elastic oil bag 52 is in communication with the cavity 4. Additionally, the piston 53 is fixedly connected to the lower end of the elastic oil bag 52, and the piston 53 is arranged in the cylinder 51 and capable of sliding axially along an inner cavity of the cylinder 51.

When the steering motor shakes, the piston 53 slides upwards and downwards in the cylinder 51 along with shocks of the steering motor; the elastic oil bag 52 is driven by the sliding to be stretched or compressed. When the elastic oil bag 52 is compressed, the oil fluid inside the elastic oil bag 52 will be squeezed out and flows into the axial cavity 4, then the oil fluid compresses the buffering assembly 11 and makes the buffering assembly 11 generate an elastic deformation, thereby buffering the shocks. When the elastic oil bag 52 is stretched, the oil fluid in the axial cavity 4 will flow back into the elastic oil bag 52, and the buffering assembly 11 recovers from the deformation.

Figure 3:
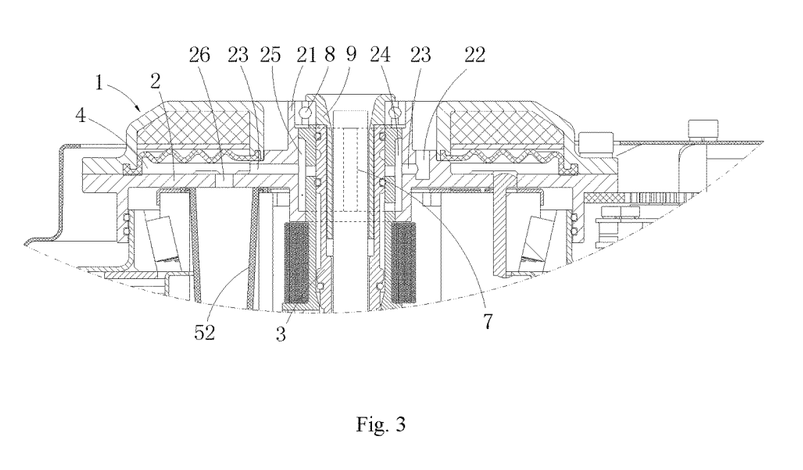
FIG. 3 is a partially enlarged schematic view of an oil distributor portion in FIG. 1.

The oil distributor 2 is provided with a hollow column 21 which respectively extends upwards downwards and is arranged axially; the hollow column 21 is provided with an inner cavity. The oil distributor 2 is further provided with an oil inlet 22 and an oil flow passage 23 arranged radially. An inner wall of the hollow column 21 is provided with an oil flow opening which is in communication with the oil flow passage 23. The oil flow passage 23 is in communication with an inner cavity of the hollow column 21 through the oil flow opening, and the oil flow passage 23 is further in communication with the axial cavity 4. An inner side of the hollow column 21 is provided with a reversing valve 3, and the reversing valve 3 is provided with a valve core 31 and a valve cavity 32. An inner wall of the hollow column 21 and an outer wall of the valve cavity 32 form a first radial cavity. The first radial cavity is embedded with a pin 7. The first radial cavity is separated by the pin 7 to form an oil-distributor oil-inlet cavity 24 and an oil-distributor oil-outlet cavity 25 which are independent of each other; wherein the oil-distributor oil-inlet cavity 24 is in communication with the oil inlet 22, and the oil-distributor oil-outlet cavity 25 is in communication with the axial cavity 4.

Figure 4:
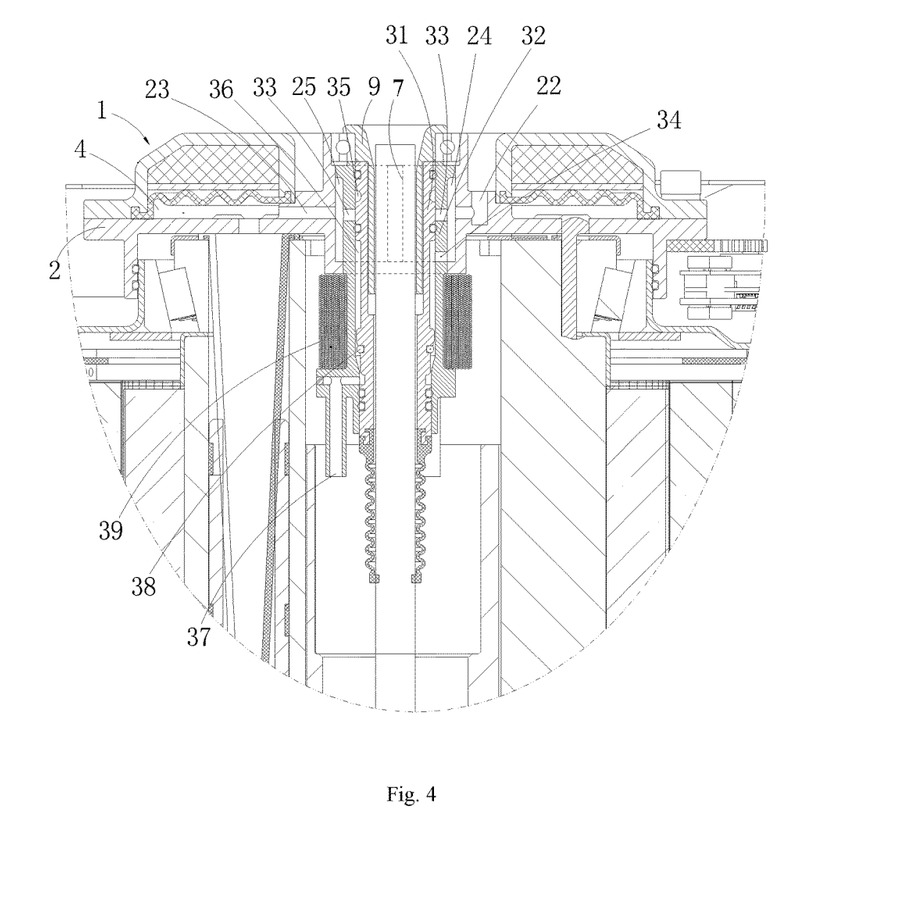
FIG. 4 is a partially enlarged schematic view of a reversing valve portion in FIG. 1.
Figure 5:
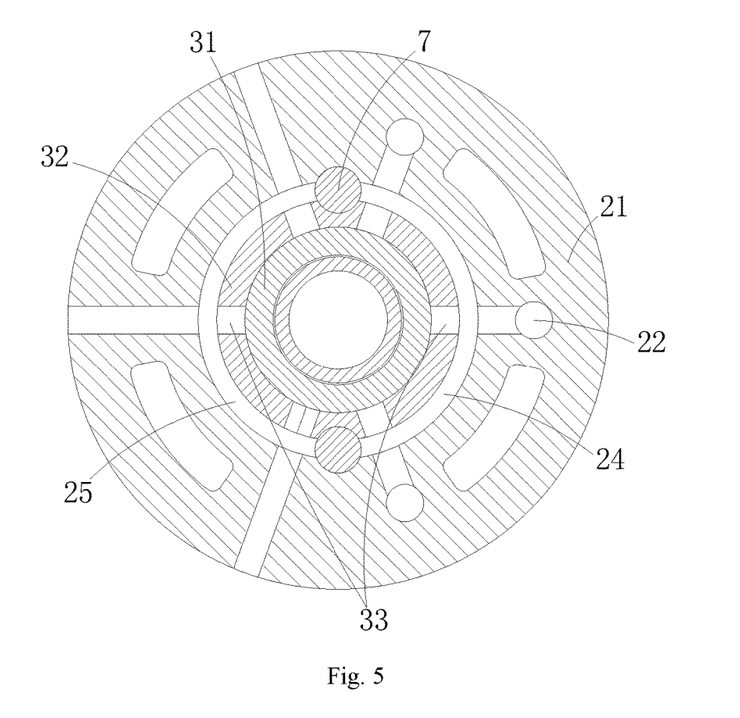
FIG. 5 is a sectional schematic view along the cutting direction A-A of FIG. 1.
Figure 6:
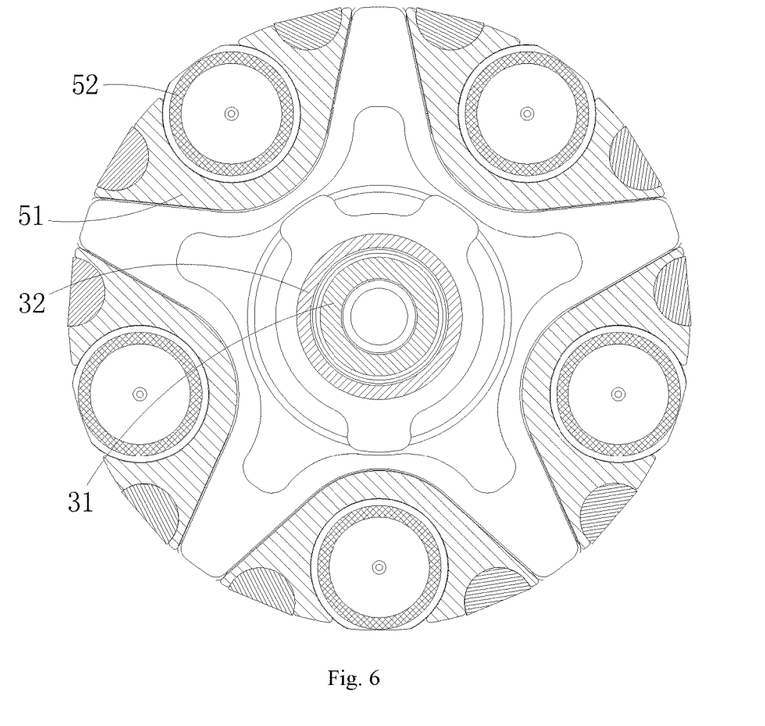
FIG. 6 is a sectional schematic view along the cutting direction B-B of FIG. 1.

A center of the valve core 31 is provided with a circular through-hole; a plurality of open ring slots are arranged around an outer wall of the valve core 31, and each of the open ring slots is embedded with an O-shaped seal ring 38.

An upper portion of a sidewall of the valve cavity 32 is provided with a reversing-valve oil-flow passage 33 arranged to penetrate radially. An axial lower portion of the reversing-valve oil-flow passage 33 is provided with an oil flow hole 34 arranged radially. Furthermore, an oil-flow ring slot 35 with a semicircle shaped section is arranged around an upper portion of an outer wall of the valve core 31; the oil-flow ring slot 35 is respectively in communication with the oil-distributor oil-inlet cavity 24 and the oil-distributor oil-outlet cavity 25. A second radial cavity 36 is formed between an outer wall of a lower end of the valve core 31 and an inner wall of a lower portion of the valve cavity 32. A lower portion of the valve cavity 32 is provided with an oil outlet 37, and the oil outlet 37 is in communication with the second radial cavity 36.

The entry path of the oil fluid is that: the oil fluid enters the oil-distributor oil-inlet cavity 24 from the oil inlet 22, and passes through an oil passage constituted by the reversing-valve oil-flow passage 33 and the oil-flow ring slot 35; the oil fluid then passes through the oil-distributor oil-outlet cavity 25, enters the axial cavity 4, and passes through the aforesaid damping hole 26 to flow into the elastic oil bag 52.

As described above, the oil-distributor oil-inlet cavity 24 is in communication with the reversing-valve oil-flow passage 33, the oil-flow ring slot 35, the oil-distributor oil-outlet cavity 25, and the axial cavity 4 so as to form an oil passage. The oil passage is configured for the oil supply to a steering motor hydraulic damping system and the hoist oil supply. The oil-distributor oil-inlet cavity 24 is in communication with the oil flow hole 34, the second radial cavity 36, and the oil outlet 37 so as to form another oil passage which is configured for the oil supply for steering motor braking. By upward and downward movements of the valve core 31 inside the valve cavity 32, and cooperation among the oil-flow ring slot 35, a plurality of the O-shaped sealing ring 38, and an inner wall of the valve cavity 32, a non-interference switch between the two oil passages can be realized.

In order to control on and off states of the input oil fluid, the valve core 31 moves upwards and downwards inside the inner wall of the valve cavity 32, and the oil-flow ring slot 35 and a plurality of the O-shaped seal rings 38 are fitted with the inner wall of the valve cavity 32, so that the communication or block between the oil flow hole 34 and the second radial cavity 36 is realized, and the connection or block between the oil-distributor oil-inlet cavity 24 and the axial cavity 4 is further realized. Surely, in other embodiments, according to actual conditions and requirements, other components or methods can be also adopted to control the on and off states of the oil fluid in the oil flow passage.

The adoption of the aforesaid steering motor has the following features:

1) The sealed axial cavity 4 is formed by fitting the upper cover buffering assembly 1 with the oil distributor 2; both the oil-distributor oil-outlet cavity 25 which is in communication with the axial cavity 4 and the reversing-valve oil-flow passage 33 are in communication with the oil-distributor oil-inlet cavity 24 through the oil-flow ring slot 35; the second radial cavity 36 is in communication with the oil flow passage 34, the oil-distributor oil-inlet cavity 24 and the oil outlet 37. By the upward and downward movements of the valve core 31 inside the valve cavity 32, and the cooperation among the oil-flow ring slot 35, the plurality of the O-shaped sealing rings 38, and the inner wall of the valve cavity 32, a non-interfering switch between the aforesaid two oil passages can be realized. This design reduces the space occupied by the two oil passages, and further reduces the volume of the steering motor, and saves resources as well as cost.

2) The sealed axial cavity 4 is formed by fitting the upper cover buffering assembly 1 with the oil distributor 2; a buffering assembly 11 is arranged inside the axial cavity 4, and a cylinder assembly 5 docked with the axial cavity 4 is arranged at a lower side of the oil distributor 2. Through the sealed communication between the elastic oil bag 52 of the cylinder assembly 5 and the axial cavity 4, the defect that components of the cylinder assembly 5 in a traditional hydraulic damping mechanism are prone to wear and sensitive to temperature has been overcome by the elastic oil bag 52, thereby prolonging the service life of the damping mechanism and saving cost.

Figure 2:
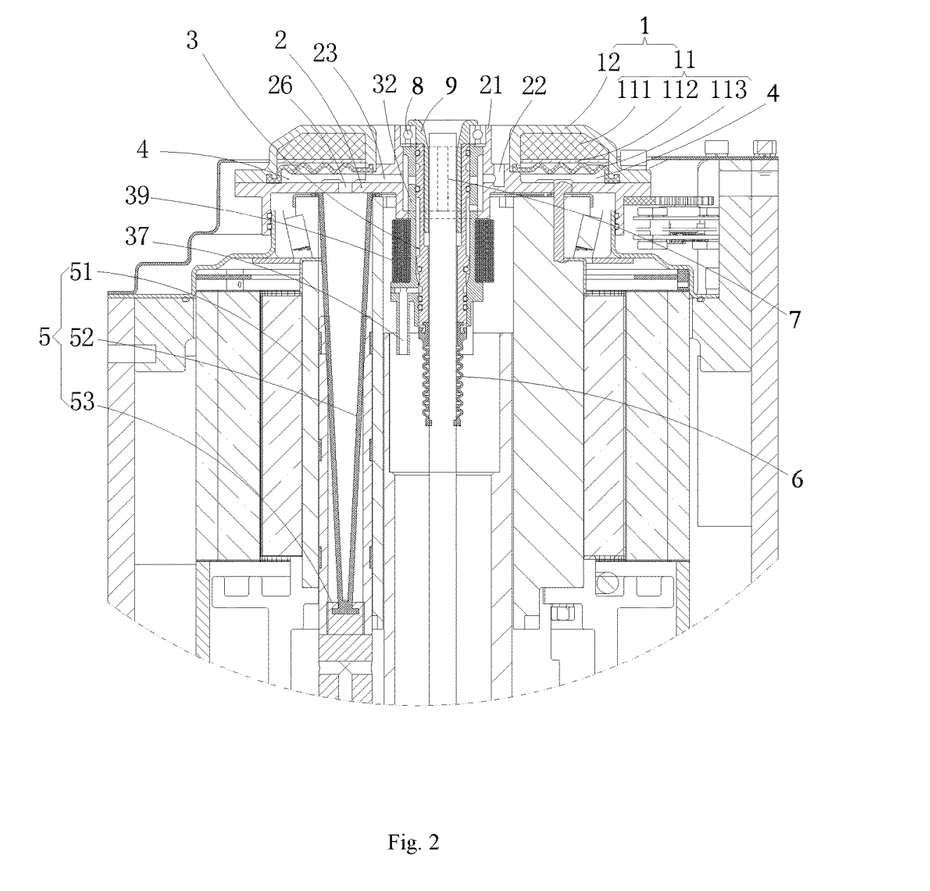
FIG. 2 is a partially enlarged schematic view of FIG. 1.

In this embodiment, the upper cover buffering assembly 1 includes an upper cover 12 and the buffering assembly 11. The purpose of the buffering assembly 11 herein is to achieve buffer and damping by elastic deformation thereof. The buffering assembly 11 includes an elastomer 111, an elastic spacer 112 and an elastic diaphragm 113. Wherein, the elastomer 111, the elastic spacer 112 and the elastic diaphragm 113 are laminated inside the axial cavity 4 in sequence from top to bottom. An edge of the elastic diaphragm 113 is embedded into a lower margin of the inner side of the upper cover 12 and fixedly connected with an inner wall of the axial cavity 4 to form a seal, therefore, the elastomer 111 and the elastic spacer 112 are sealed by the elastic diaphragm 113 inside a chamber formed by an inner wall of the axial cavity 4 and the elastic diaphragm 113. Herein, the elastomer 111 and the elastic spacer 112 can move inside the chamber. Surely, in other embodiments, according to actual conditions and requirements, the buffering assembly 11 can be of other types of buffer structures.

An undersurface of the bottom end of the oil distributor 2 is provided with a damping hole 26, and the damping hole 26 is arranged to be aligned with the opening at the upper end of the elastic oil bag 52, in this way, the elastic oil bag 52 is in communication with the axial cavity 4 through the damping hole 26. Surely, in other embodiments, the elastic oil bag 52 can be in hermetical communication with the cavity 4 in other ways, such as a pipe connection or a passage connection, etc.

An aperture of the damping hole 26 is smaller than a caliber of the upper opening of the elastic oil bag 52. In this way, when the elastic oil bag 52 is compressed by the aforesaid piston 53, the oil fluid inside the elastic oil bag 52 will be squeezed out and flow into the axial cavity 4 through the damping hole 26. The damping hole 26 thus provides a damping buffer function. Surely, this is just one buffering form; in other embodiments, other buffering forms can also be adopted.

In the embodiment, the elastic diaphragm 113 is butterfly-shaped. The structure of the oil distributor 2 matches with and corresponds to the structure of the upper cover buffering assembly 1; the oil distributor 2 and the upper cover buffering assembly 1 are fitted with each other and connected hermetically through a fastener. Herein, the fastener is a bolt; surely, other types of fasteners can also be adopted. In other embodiments, according to actual conditions and requirements, the upper cover buffering assembly 1 and the oil distributor 2 can also adopt other types of structures.

In this embodiment, a plurality of groups of the cylinder assemblies 5 are arranged inside the damping mechanism. Each group of the cylinder assemblies 5 are arranged under the oil distributor 2. Upper ends of each group of the cylinder assemblies 5 are all docked with a bottom surface of the oil distributor 2. Surely, each elastic oil bag 52 of each group of the cylinder assemblies 5 is in communication with the axial cavity 4 through respective damping holes 26. Furthermore, each group of the cylinder assemblies 5 are arranged in circular inside the steering motor. Surely, in other embodiments, the number of the cylinder assemblies 5 can be determined according to the actual conditions, and each group of the cylinder assemblies 5 can also be arranged in other forms.

In this embodiment, the reversing valve 3 is an electromagnetic reversing valve. The reversing valve 3 further includes a winding coil 39. Specifically, the valve cavity 32 is arranged on the inner wall of an upper portion of the hollow column 21; the winding coil 29 is sheathed around an outer wall of the valve cavity 32; the outer wall is provided with an axial locating flange; the winding coil 39 is located below the hollow column 21 and above the locating flange of the outer wall of the valve cavity 32. Surely, in other embodiments, according to actual conditions and requirements, other types of reversing valves can also be adopted.

In the original state, the oil-flow ring slot 35 and the oil flow passage 23 are staggered; the reversing-valve oil-flow passage 33 is blocked by an outer wall of the valve core 31. At this time, the second radial cavity 36 is in communication with the oil-distributor oil-inlet cavity 24 through the oil flow hole 34, that is, an oil passage formed by the oil-distributor oil-inlet cavity 24 and the second radial cavity 36 forms a clear passage, and an oil passage formed by the oil-distributor oil-inlet cavity 24, the axial cavity 4 and the elastic oil bag 52 is blocked. When the winding coil 39 is electrified, the whole valve core 31 moves down, the oil-flow ring slot 35 is aligned with and in communication with the oil flow passage 33; the O-shaped seal ring 38 at a lower cone of the valve core 31 compresses a circular cone at the bottom of the valve core 32, that is, the second radial cavity 36 is blocked. In this way, the oil passage formed by the oil-distributor oil-inlet cavity 24, the axial cavity 4 and the elastic oil bag 52 forms a clear passage. At the same time, the oil passage formed by the oil-distributor oil-inlet cavity 24 and the second radial cavity 36 is blocked. The reversing and switch function of the reversing valve 3 achieves a switch between the two oil passages, without interference.

In this present embodiment, the bottom end of the valve core 31 is provided with a valve tail, and the valve tail extends downwards beyond the bottom end of the valve cavity 32; both an inner wall and an outer wall of the valve tail are provided with open slots which each penetrate in a circumferential direction. A hollow bellows 6 is embedded inside each open slot; the hollow bellows 6 extends downwards beyond the bottom end of the valve core 31.

A top end of an inner wall of the hollow column 21 is sheathed around a deep groove ball bearing 8. A hollow sleeve 9 is sheathed in an inner ring of the deep groove ball bearing 8. The valve core 31 is provided with a circular through-hole penetrating the valve core 31 from top to bottom. An inner diameter of the hollow sleeve 9 is smaller than an inner diameter of the circular through-hole. In other embodiments, the top end of the inner wall of the hollow column 21 can also be sheathed around other types of bearings.

A pipeline sheath 17 is arranged inside the hollow sleeve 9. The pipeline sheath 17 extends downwards along the inner wall of the hollow sleeve 9 and beyond the bottom end of the valve core 31, and further beyond the hollow bellows 6. The hollow bellows 6 and the hollow sleeve 9 support and locate the pipeline sheath 17. In this embodiment, the pipeline sheath 17 is configured to be sheathed around a hand brake stayguy. Surely, in other embodiments, the arrangement of the hand brake stayguy can also adopts other methods; the pipeline sheath 17 can also be configured to arrange other pipelines.

Furthermore, a traditional steering motor is generally provided therein with a containing slot, and oil pipelines and cables are arranged inside the containing slot. However, when the steering motor is working, the oil pipelines and the cables may be rubbed against the slot wall of the containing slot due to constant rotations and are very prone to wear. Inside the steering motor provided by this embodiment, the oil pipelines and the cables are hung in spiral shapes or arranged along an axis of rotation. Therefore, when the steering motor is working, the oil pipelines and the cables rotate synchronously along with their sheaths or do not rotate, thereby avoiding damages due to friction and saving cost.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A steering motor, wherein the steering motor comprises a casing with a cavity and a stator arranged in the cavity of the casing; an outer wall of the stator and an inner wall of the casing form a chamber;

the steering motor further comprises an upper cover buffering assembly and an oil distributor; the oil distributor is arranged under the upper cover buffering assembly, and fitted with the upper cover buffering assembly to form an axial cavity;

a cylinder assembly is fixedly arranged under the oil distributor; the cylinder assembly comprises a cylinder with openings defined at two ends thereof, and an elastic oil bag arranged in the cylinder and defining an opening at an upper end thereof; the upper end of the elastic oil bag is fixedly connected to an inner wall of the cylinder and communicated with the axial cavity; the cylinder is further provided therein with a piston that is capable of sliding axially along the cylinder; the piston is connected to a lower end of the elastic oil bag;

the oil distributor is provided with an oil flow passage arranged radially and in communication with the axial cavity; the oil distributor is provided with an oil inlet;

a hollow column that is arranged axially and has an inner cavity extends upwards and downwards respectively inside the oil distributor; an inner wall of the hollow column is provided with an oil flow opening in communication the oil flow passage;

an inner side of the hollow column is provided with a reversing valve which has a valve core; an inner sidewall of the hollow column and an outer wall of the reversing cavity form a first radial cavity; the first radial cavity is embedded with a pin; the first radial cavity is separated by the pin to form an oil-distributor oil-inlet cavity and an oil-distributor oil-outlet cavity which are independent of each other; the oil-distributor oil-inlet cavity is in communication with the oil inlet, and the oil-distributor oil-outlet cavity is in communication with the axial cavity;

a center of the valve core is provided with a circular through-hole; a plurality of open ring slots are arranged around an outer wall of the valve core; each of the open ring slots is embedded internally with an O-shaped seal ring;

an upper portion of a sidewall of the valve cavity is provided with a reversing-valve oil-flow passage arranged to penetrate radially, and an axial lower portion of the reversing-valve oil-flow passage is provided with an oil flow hole arranged radially;

an oil-flow ring slot with a semicircle shaped section is arranged around an outer wall of an upper end of the valve core, and the oil-flow ring slot is in communication with the oil-distributor oil-inlet cavity and the oil-distributor oil-outlet cavity;

an outer wall of a lower end of the valve core and a sidewall of a lower portion of the valve cavity form a second radial cavity; a lower portion of the valve cavity is provided with an oil outlet; the oil outlet is in communication with the second radial cavity.

2. The steering motor of claim 1, wherein the reversing valve further comprises a winding coil positioned under the oil distributor and sheathed around a periphery of the valve cavity.

3. The steering motor of claim 1, wherein the upper cover buffering assembly comprises an upper cover and a buffering assembly; the buffering assembly comprises an elastomer, an elastic spacer and an elastic diaphragm which are laminated inside the axial cavity in sequence; an edge of the elastic diaphragm is embedded into a lower margin of the inner side of the upper cover and fixedly connected with an inner wall of the axial cavity and forms a seal.

4. The steering motor of claim 3, wherein a bottom end of the oil distributor is provided with a damping hole and the damping hole is arranged to be aligned with the top end of the elastic oil bag, and is in communication with the axial cavity and the elastic oil bag respectively.

5. The steering motor of claim 4, wherein an aperture of the damping hole is smaller than a caliber of the opening of the upper end of the elastic oil bag.

6. The steering motor of claim 5, wherein the elastic diaphragm is butterfly-shaped; the oil distributor and the upper cover buffering assembly are fitted with each other to form a seal through a fastener.

7. The steering motor of claim 6, wherein, the steering motor comprises a plurality of the cylinder assemblies; each of the cylinder assemblies is positioned under the oil distributor, and is arranged in circular inside the steering motor.

8. The steering motor of claim 7, wherein a bottom end of the valve core is provided with a valve tail, and the valve tail extends downwards to the bottom end of the valve cavity; both an inner wall and an outer wall of the valve tail are provided with open slots; a hollow bellows is embedded inside the open slots; the hollow bellows extends downwards beyond the bottom end of the valve core.

9. The steering motor of claim 8, wherein an inner wall of a top end of the hollow column is sheathed with a deep groove ball bearing; a hollow sleeve is sheathed in an inner ring of the deep groove ball bearing; an inner diameter of the hollow sleeve is smaller than an inner diameter of the circular through-hole defined in the valve core.

10. The steering motor of claim 9, wherein a pipeline sheath is arranged inside the hollow sleeve; the pipeline sheath extends downwards along the inner wall of the hollow sleeve and beyond the hollow bellows.

* * * * *